(12) United States Patent
Tu et al.

(10) Patent No.: US 11,636,580 B2
(45) Date of Patent: Apr. 25, 2023

(54) HUMAN PORTRAIT SEGMENTATION BASED IMAGE PROCESSING SYSTEM

(71) Applicant: Black Sesame International Holding Limited, San Jose, CA (US)

(72) Inventors: Fangwen Tu, Singapore (SG); Bo Li, Singapore (SG); Jin Xu, Singapore (SG); Jizhang Shan, Los Gatos, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 145 days.

(21) Appl. No.: 17/382,016

(22) Filed: Jul. 21, 2021

(65) Prior Publication Data

US 2023/0029670 A1 Feb. 2, 2023

(51) Int. Cl.
| | | |
|---|---|---|
| *G06T 5/20* | (2006.01) | |
| *G06N 3/08* | (2023.01) | |
| *G06F 18/25* | (2023.01) | |
| *G06F 18/241* | (2023.01) | |
| *G06F 18/2132* | (2023.01) | |

(52) U.S. Cl.
CPC ............ *G06T 5/20* (2013.01); *G06F 18/2132* (2023.01); *G06F 18/241* (2023.01); *G06F 18/25* (2023.01); *G06N 3/08* (2013.01)

(58) Field of Classification Search
CPC ..... G06T 5/20; G06F 18/2132; G06F 18/241; G06F 18/25; G06N 3/08
See application file for complete search history.

(56) References Cited

U.S. PATENT DOCUMENTS

| 9,807,316 | B2 | 10/2017 | Jen et al. | |
|---|---|---|---|---|
| 11,568,544 | B2* | 1/2023 | Lin | ......................... G06T 11/60 |
| 2019/0325269 | A1* | 10/2019 | Bagherinezhad | ........ G06N 3/08 |
| 2020/0213212 | A1* | 7/2020 | Dillon | ..................... H04L 43/16 |
| 2021/0166347 | A1* | 6/2021 | Arani | ........................ G06T 7/11 |
| 2022/0044407 | A1* | 2/2022 | Liu | ........................... G06T 7/11 |
| 2022/0198671 | A1* | 6/2022 | Price | ...................... G06T 7/162 |
| 2022/0207745 | A1* | 6/2022 | Cohen | .................. G06V 10/454 |
| 2022/0245824 | A1* | 8/2022 | Liu | ........................... G06T 7/11 |
| 2022/0262009 | A1* | 8/2022 | Yu | ......................... G06T 7/194 |
| 2022/0292650 | A1* | 9/2022 | Amirghodsi | ............. G06N 3/08 |
| 2022/0292684 | A1* | 9/2022 | Wang | ......................... G06T 7/11 |
| 2022/0327657 | A1* | 10/2022 | Zheng | ..................... G06T 9/002 |

OTHER PUBLICATIONS

Zhang, Gang, et al. "Refinemask: Towards high-quality instance segmentation with fine-grained features." Proceedings of the IEEE/CVF conference on computer vision and pattern recognition. 2021. (Year: 2021).*

Badrinarayanan et al, SegNet: A Deep Convolutional Encoder-DecoderArchitecture for Image Segmentation, IEEE Transactions on Pattern Analysis and Machine Intelligence, vol. 39, No. 12, Dec. 2017 (Year: 2017).*

* cited by examiner

*Primary Examiner* — Andrae S Allison
(74) *Attorney, Agent, or Firm* — Timothy T. Wang; Ni, Wang & Massand, PLLC

(57) ABSTRACT

The present invention discloses system and method for processing an image. The invention processes the image by segmenting a human portrait region of the image. The invention uses ahierarchical hybrid loss module for masking the portrait region generating masked portrait region. The invention also uses data learning the masked portrait region.

14 Claims, 7 Drawing Sheets

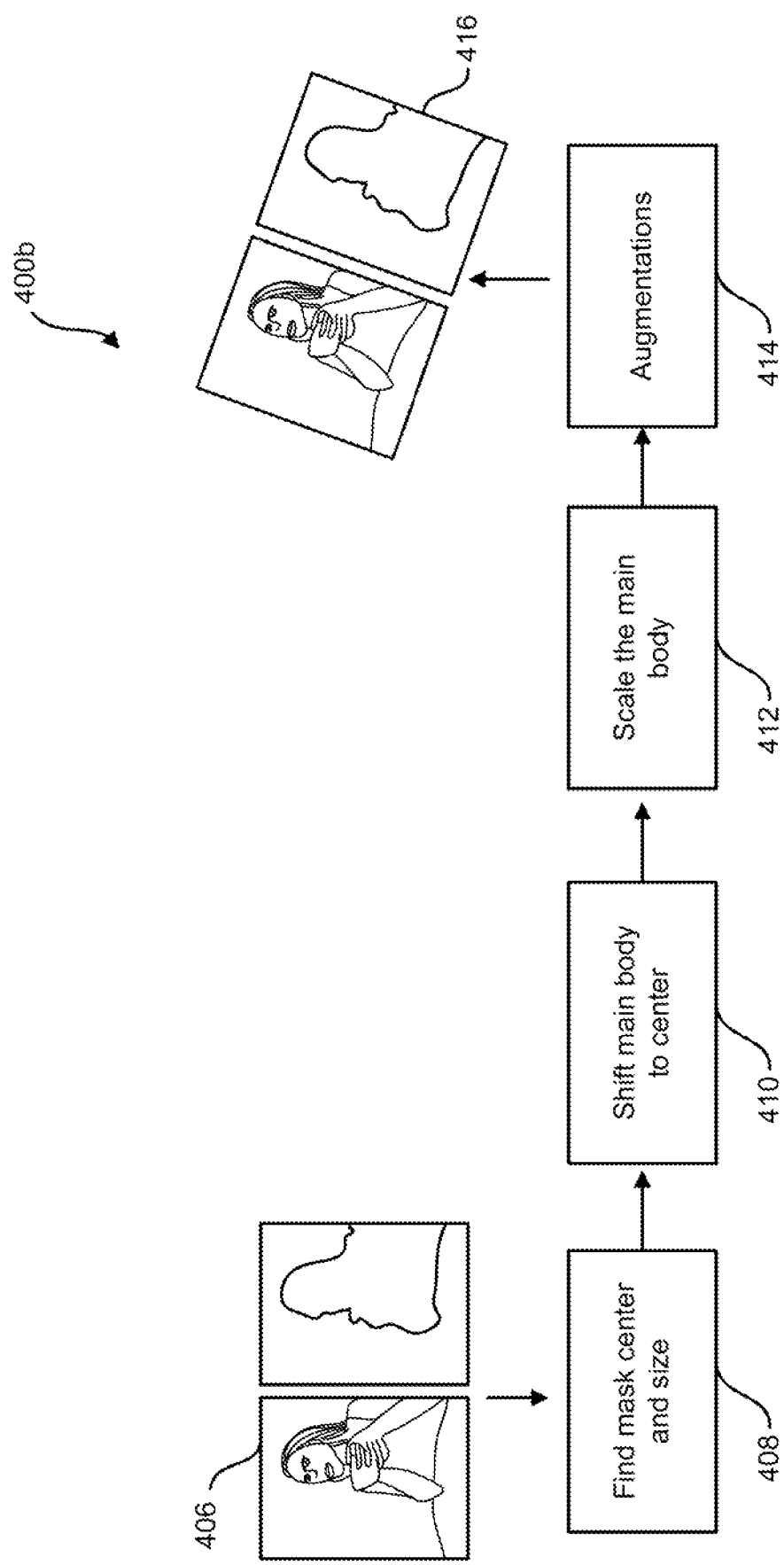

HUMAN PORTRAIT SEGMENTATION BASED IMAGE PROCESSING SYSTEM

FIELD OF INVENTION

The present invention generally relates to systems and methods for processing a portrait region of an image. More specifically, the present invention is directed to segmenting a human portrait region of the image.

BACKGROUND OF THE INVENTION

Human portrait segmentation technology is applied in movie industry, online education, entertainment and etc. Traditionally, this task is achieved through green screen technology which requires expensive equipment and specific environment. Most segmentation methods depend on the colour difference between foreground and background to achieve background subtraction. These methods suffer from unstable result when the colour difference is not obvious.

An issued U.S. Pat. No. 9,807,316 assigned to HTC Corp. discloses a technology related to extracting an object from an image captured by the first camera according to the adaptive model mask. Furthermore, the patent discloses an adaptive model mask according to the pose data POS based on a relative motion between a camera and a foreground object. Though the process is providing three layers of mask for segmentation, it still lacks to precisely segment the whole portrait region and centre alignment of the portrait region in the image.

Another WO patent application 2009109127 assigned to The Chinese University Of Hong Kong, discloses a technology related to a human feature recognition system which includes a face detection module employing an active boosting procedure and a lazy boosting procedure on a hybrid cascade structure, a human body segmentation module and a boundary matting module. Though, the invention is advancement to prior patent as it includes a technique for semantic object extraction. The invention is useful in digital video processing, pattern recognition, and computer vision. Still, the invention fails to provide a cost-effective and a precisely segmented portrait in an image.

Another CN patent application 110689542 assigned to Tsinghiu University provides a human image segmentation processing based on a multi-stage convolution neural network. Though, the invention is advancement to the prior inventions to divide the portrait in real time accurately and efficiently. Still, the patent lacks the capability for portrait segmentation through simple tools rather uses hi-tech and costly tools for the segmentation.

Therefore to overcome the shortcomings of the prior-arts like handle challenging components of human body such as hair and hand, there is a need to provide a hierarchical hybrid loss instead of traditional segmentation loss. Finally, to custom the application of human portrait segmentation and reduce the learning space dimension, a unique data augmentation strategy is innovated which uniform the training data distribution to achieve more stable performance and fast convergence. In view of the foregoing inventions, there is a need in the art for a system to overcome or alleviate the before mentioned shortcomings of the prior arts.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an advanced image processing system that recognizes human portrait in the image and perform segmentation followed with an aligned portrait in the image as an output.

SUMMARY OF THE INVENTION

The invention utilizes a low-cost neural network to predict object segmentation. The inventions includes a skip fusion connection network structure which uses less hidden layer parameters and reduce computation cost a lot.

The emerging and fast developing smart mobile devices usage, people are able to experience a more convenient and intelligent way of life within one click distance. Different from the traditional bulky PC or even laptop, smart phone with its superior portability and high computation power has played a vital role of our daily assistant. People use smart phone to have business meetings, order foods, buy movie tickets.

Apart from the basic and passive interactions, people now expect a more in-depth communication with the device which forces it to equip with more intelligence. Thanks to the powerful deep learning technologies, the smart devices have the capabilities to understand the world better. Since such devices will frequently interact with human users, the understanding of human attribute or behaviour is of importance.

Semantic segmentation, as the essential basic function, can provide the location of interesting objects in image with pixel level accuracy through semantic level intelligence of the machine. It paves the way to further processing and improvement in aspect of photographic beatification, AR, VR and other commercial applications. However, how to provide high quality and robust semantic segmentation mask and simultaneously shrink the computational complexity on edge computation chips is very challenging.

Before the prevailing of deep neural networks, researchers who wish to achieve human portrait segmentation need to extract features manually such as skin color, body shape, face characteristics and then send into a designed classifier like Adaboost. These methods usually suffer from lack of generalization problem. They are brittle to external noise such as illumination changes, body shape deformation, even motion blur.

The emerging of deep learning network is able to alleviate such problems because they learn from a huge number of examples with its powerful regression capability. The robustness problem is much improved, but it is still not enough to be applied to industry application especially on embedded or mobile devices.

In order to guarantee the accuracy of this pixel-level classification problem, most of the researchers utilize a very heavy network such as FCN, which brings large computational cost for the devices. Few innovations have been conducted to design efficient but hardware friendly network to balance the contradiction between performance and complexity.

Segmenting the details requires additional efforts that can usually lead to more complicated network like the matting head. By applying loss penalties during the training is a solution to that problem.

Finally, as for the training set, in order to improve the diversity of the samples, data augmentations are widely adopted. However, with the increasing amount of data, the human location distribution will be not uniform. Few works solve this problem because there is rare high-quality human segmentation dataset available and to fit the low-quality annotation, they tend to use high complexity network. If one wishes to reduce the neural layers of a network, the dimension of the target problem to learn should also reduce accordingly.

The primary objective of the invention is to provide a novel human portrait segmentation system deployable complexity and superior performance. The system is an image processing system for processing an image, wherein the image processing system includes a classification modules consisting of an encoder-decoder unit and skip fusion connection logic.

The encoder-decoder unit includes an encoder and a decoder. The encoder extracts and classifies a number of discriminative features and a number of similar features from the portrait region. The numbers of similar features are classified based on semantic classification at one or more pre-defined levels. The decoder refines the one or more similar features to generate a number of refined features. The skip fusion connection logic concatenates the number of refined features to generate a refined portrait region of the image.

Ahierarchical hybrid loss module includes binary cross entropy (BCE) loss unit, a gradient loss unit and local balanced cross entropy (BCE) loss unit. The BCE loss unit regulates a first masking applied on a first portion of the refined portrait region. The gradient loss unit applies a second masking the refined portrait region and the local binary cross entropy loss unit regulates a third masking applied on a second portion of the refined portrait region to form a masked portrait region.

A human centric data augmentation module performs a pre-alignment of the masked portrait region to centre area and generates an output image.

The other objective of the invention is to provide anencoder-decoder architecture with light skip connection fusion to generate a refined portrait region of the image.

Another objective of the invention is to provide a Hierarchical hybrid loss for rich details segmentation and forming a masked portrait region.

The yet another objective of the invention is to provide a Human-centric data augmentation scheme to uniform the training data distribution and performs a pre-alignment of the masked portrait region to centre area and generates an output image.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 4B illustrates the human centric data augmentation module in accordance with the present invention.

DETAILED DESCRIPTION OF THE DRAWINGS

With the emergence and fast development of smart mobile device usage, people are able to experience a more convenient and intelligent way of life within one click distance. Different from the traditional bulky PC or even laptop, smart-phone with its superior portability and high computation power has played a vital role of our daily assistant. People use smart-phone to have business meetings, order foods, buy movie tickets.

Apart from the basic and passive interactions, people now expect a more in-depth communication with the device which forces it to equip with more intelligence. Thanks to the powerful deep learning technologies, the smart devices have the capabilities to understand the world better. Since such devices will frequently interact with human users, the understanding of human attribute or behaviour is of importance.

Semantic segmentation, as the essential basic function, can provide the location of interesting objects in image with pixel level accuracy through semantic level intelligence of the machine. It paves the way to further processing and improvement in aspect of photographic beatification, AR. VR and other commercial applications. However, how to provide high quality and robust semantic segmentation mask and simultaneously shrink the computational complexity on edge computation chips is very challenging.

The invention proposes, a human segmentation methods with the following main innovations: (1) Light but efficient encoder-decoder structure with a skip fusion connection structure. (2) Hybrid loss with holistic segmentation supervision power and details engraving power. (3) Novel hierarchical data augmentation scheme to achieve allow the network perform better in practical use case.

The present invention seeks to provide an improvement in the portrait segmentation. More particularly, the invention relates to an improvement in human portrait segmentation. Moreover, the invention proposes a low-cost neural network to predict object segmentation. The invention uses a skip fusion connection network structure which using less hidden layer parameters and reduce computation cost a lot. In order to handle challenging components of human body such as hair and hand, a hierarchical hybrid loss instead of traditional segmentation loss with designed weights is presented.

Figure 1:
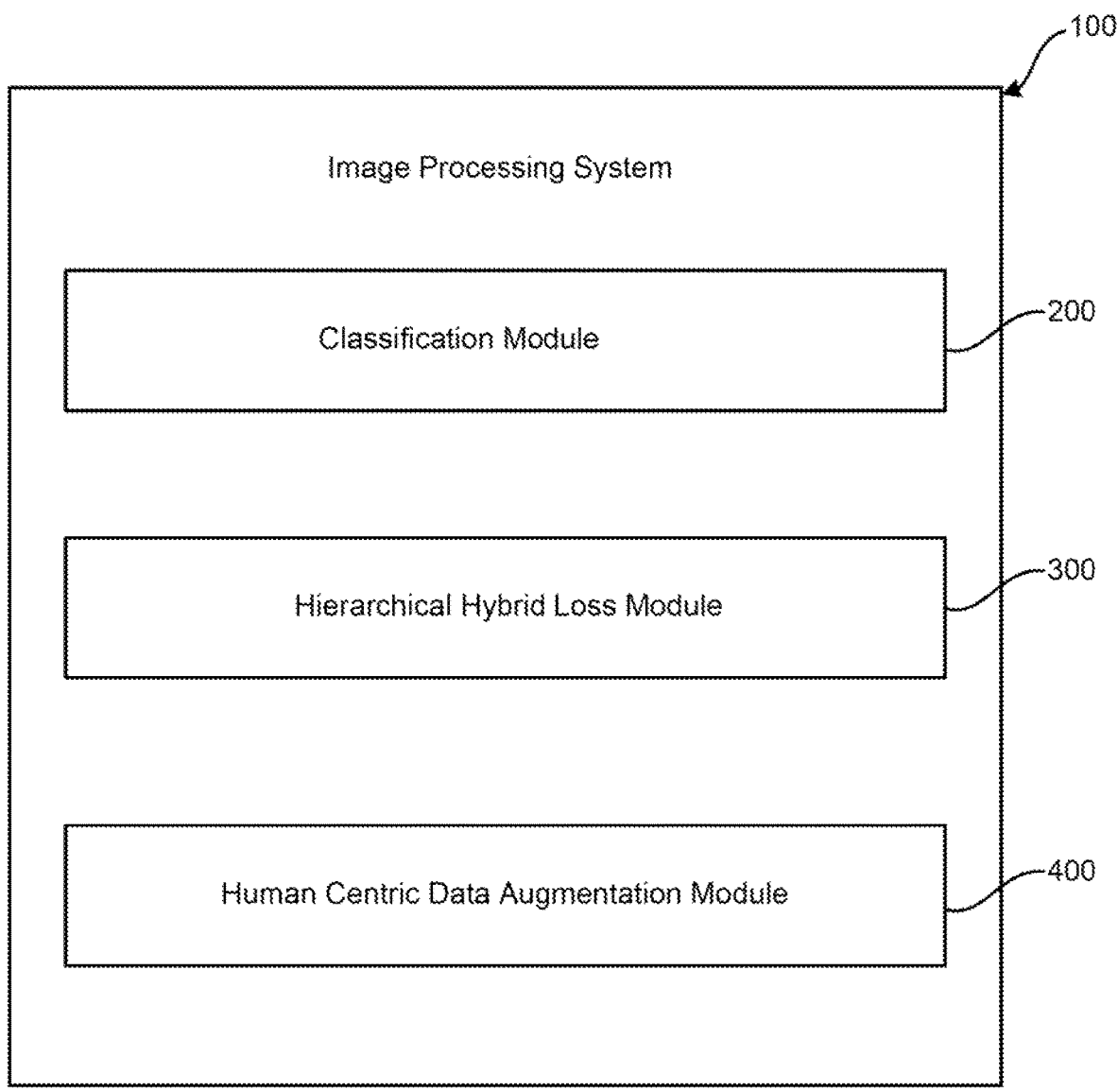
FIG. 1 illustrates animage processing system in accordance with the present invention.

FIG. 1 illustrates an image processing system in accordance with the present invention. The system is the image processing system 100 for processing an image. Particularly, the system 100 processes the image by segmenting a portrait region from the image. Moreover, the image processing system includes a classification module 200, a hierarchical hybrid loss module 300 and a human centric data augmentation module 400.

The classification module 200 includes an encoder-decoder unit and a skip fusion connection logic. The encoder-decoder unit includes an encoder and a decoder. The encoder extracts and classifies a number of discriminative features and a number of similar features from the portrait region. Furthermore, the numbers of similar features are classified based on semantic classification at one or more pre-defined levels. The encoder and the decoder form multiple layers. The decoder refines the one or more similar features to generate a number of refined features.

The skip fusion connection logic concatenates the number of refined features to generate a refined portrait region of the image. The skip fusion connection logic reuses the number of refined features in each of the one or more pre-defined levels for concatenating the one or more pre-defined levels in encoder and decoder layers. The composited is performed by adding operation of the skip fusion connection logic with fusion neurons. The fusion neurons are trained to learn the fusion ratio between the multiple similar features. The skip fusion connection logic concatenates the number of refined features on the basis of similarity in size and number of channels for adding connection.

A hierarchical hybrid loss module 300 includes balanced cross entropy (BCE) loss unit, a gradient loss unit and local balanced cross entropy (BCE) loss unit. The BCE loss unit regulates a first masking applied on a first portion of the refined portrait region. The gradient loss unit applies a second masking the refined portrait region and the local balanced cross entropy loss unit regulates a third masking applied on a second portion of the refined portrait region to form a masked portrait region. The first portion includes human and the second portion includes either a hand or a hair of human.

Moreover, the gradient loss unit is calculated using a sobel operator. The gradient loss unit penalizes one or more ridges in the portrait region of the original image. The one or more ridges include either hairs or beard. The formulation of the Hierarchical Hybrid Loss unit is calculated by combining each of the BCE loss unit, gradient loss unit and local BCE loss unit. The Hierarchical Hybrid Loss unit is tuned with one of a number of weight parameters.

A human centric data augmentation module 400 performs a pre-alignment of the masked portrait region to centre area and generates an output image.

Figure 2:
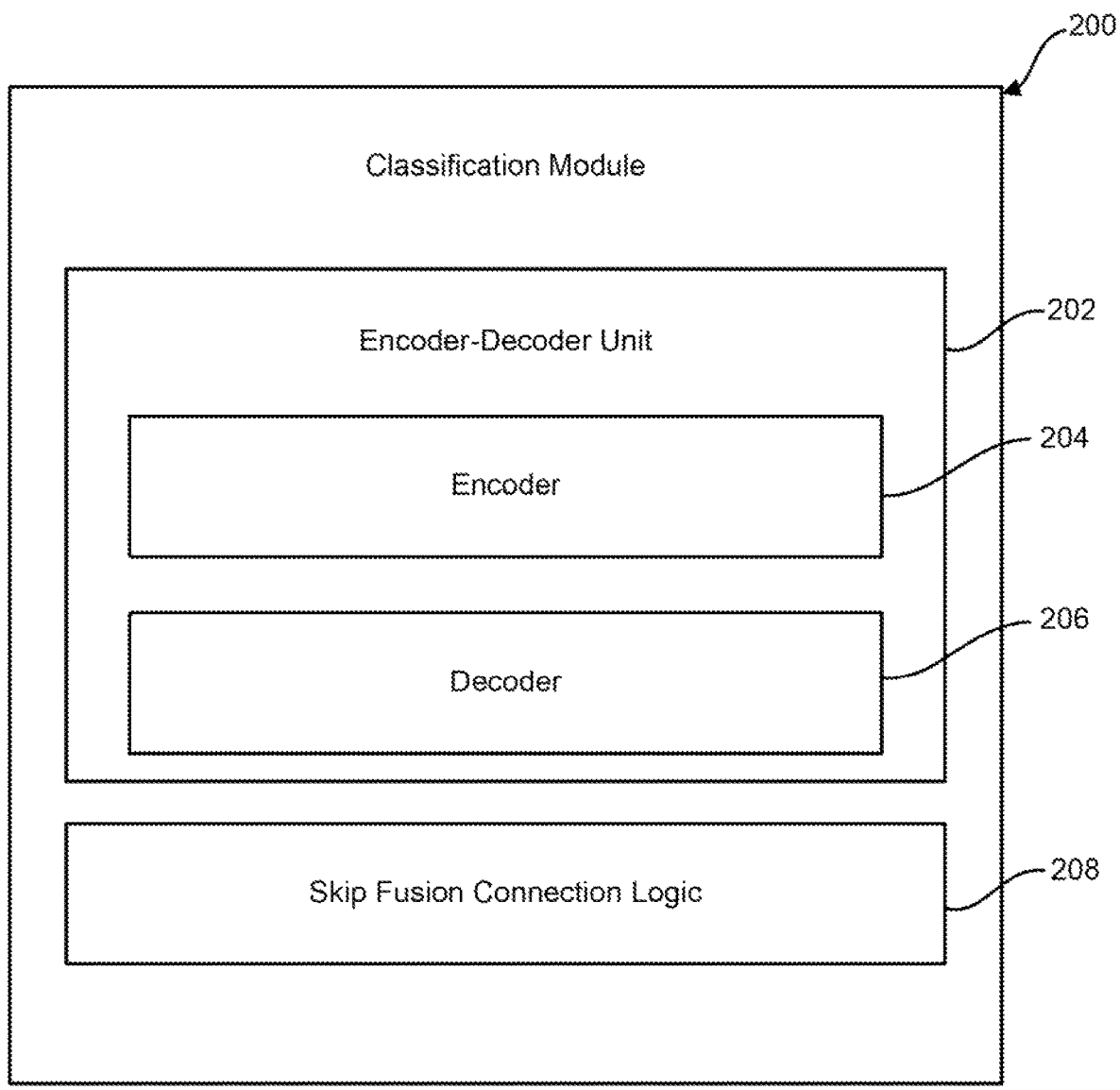
FIG. 2 illustrates a classification module of the image processing system.

FIG. 2 illustrates the classification module 200 of the image processing system. The classification module 200 classifies a portrait region of the image. The classification module includes the encoder-decoder unit 202 and the skip fusion connection logic 208.

The encoder-decoder unit 202 includes the encoder and the decoder. The encoder 204 extracts and classifies a number of discriminative features and a number of similar features from the portrait region. The numbers of similar features are than classified on the basis of semantic classification at one or more predefined levels. The decoder 206 refines the one or more similar features to generate a number of refined features. The skip fusion connection logic 208 concatenates the number of refined features to generate a refined portrait region of the image.

The image segmentation which essentially is a pixel level classification problem usually requires more complicated structures to indicate the relationship of regional pixel and the holistic semantic classification. Encoder-decoder structure is suitable to this problem since the encoder is able to extract both discriminative and semantic features at different levels while decoders will facilitate to refine the semantic details along its up-sampling route.

However, pure encoder-decoder pipeline lacks the communication between corresponding layers and leads to an absence of enough feature detail. To improve the usage of features, a skip fusion connection scheme is proposed.

The skip connection will reuse the features in each level of the encoders 204 and enhance the convergence speed during the training by connecting the corresponding level for features in encoder and decoder layers.

The most straightforward skip connection scheme is to concatenate the features in each corresponding layers with identical sizes to preserve the original descriptions within the network. However, it will inevitably increase the complexity of the framework. Sometimes, at least double the computational intensity of decoder. In order to handle this issue, we present an add operation fashion of the skip connection with fusion neurons, this requires the features of corresponding layers have not only same sizes but same number of channels such that the corresponding features can be added together.

The fusion neurons can be trained to learn the fusion ratio between features encoders and decoders. In this manner, the complexity of resultant network can be reduced. During the training, the back propagation will force the network to learn the benefits from this simplified skip connection fusion and result in a good performance.

Figure 3A:
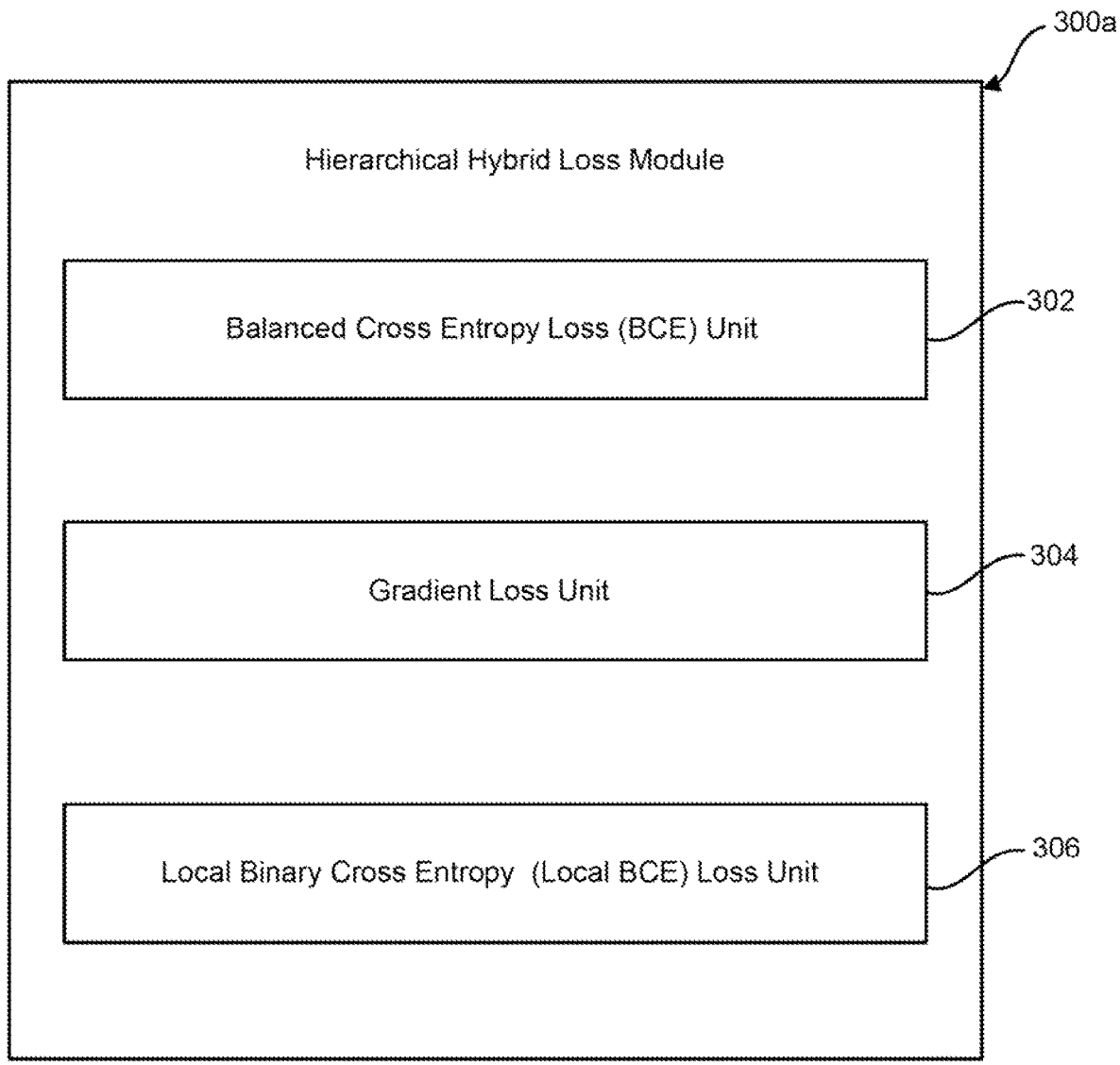
FIG. 3A illustrates a hierarchical hybrid loss module of the image processing system.

FIG. 3A illustrates a hierarchical hybrid loss module 300a within the image processing system. The hierarchical hybrid loss module 300a includes a BCE loss unit 302, a gradient loss unit 304 and a local BCE loss unit 306. The balanced cross entropy (BCE) loss unit 302 regulates a first masking applied on a first portion of the refined portrait region. The gradient loss unit 304 applies a second masking the refined portrait region. The local balanced cross entropy (BCE) loss unit 306 regulates a third masking applied on a second portion of the refined portrait region to form a masked portrait region.

The loss used in this proposal has several parts, the first one is the traditional BCE loss (Binarycross entropy) to regulate segmentation of the overall mask. Besides, a gradient loss is applied to original image and the predicted mask to preserve a rich detail. The gradient is calculated using Sobel operator.

The difference between the image of the mask is penalized. Some specific body components such as human hands are usually very hard to handle due to its extremely nonlinear local patterns. To solve this problem, and additional hand loss is presented. It is a local BCE loss that only considers the region within the hand bounding box. In order to use this loss, we also label the hand areas in segmentation ground truth. In this manner, above traditional losses, local losses are presented to refine the result which makes the outcome of the masks in a hierarchical fashion. Together with tuned weight parameters, all the losses are combined together which gives the following formulation.

Figure 3B:
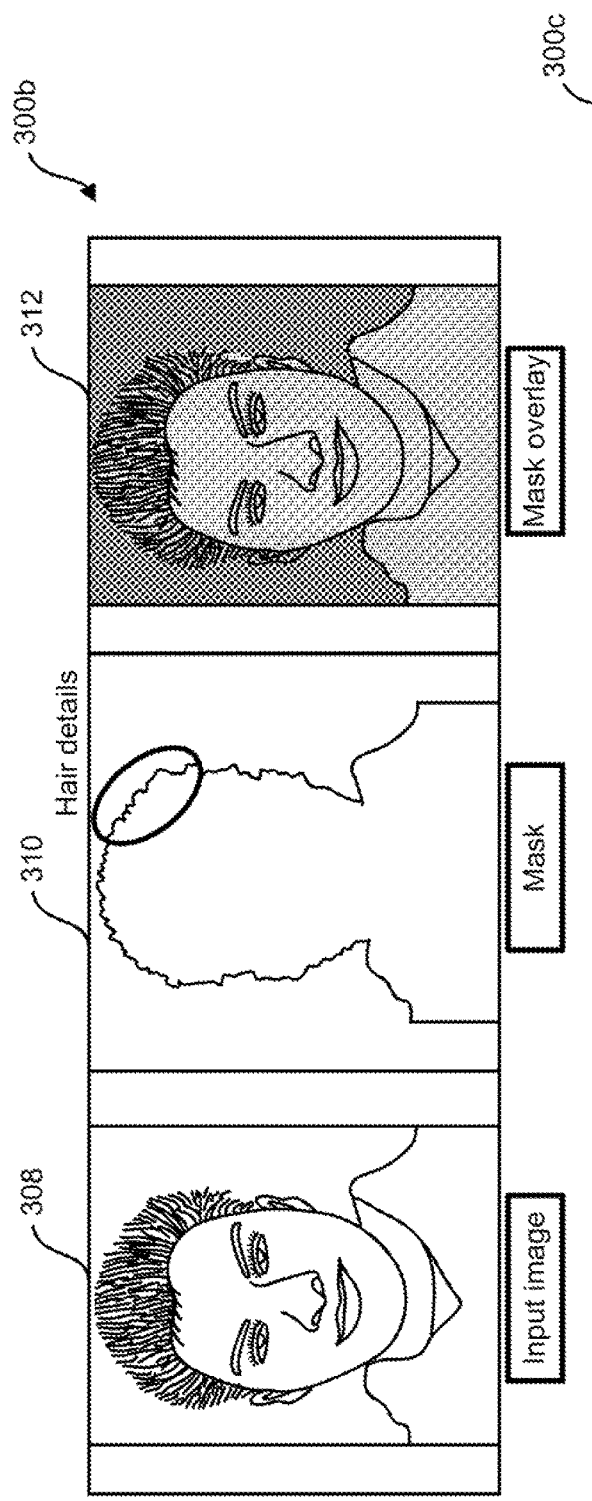
FIG. 3B illustrates a gradient loss unit of the hierarchical hybrid loss in accordance with the present invention.

FIG. 3B illustrates a gradient loss unit 300b in accordance with the present invention. The loss used in this proposal has several parts. The first one is the traditional BCE loss (Binarycross entropy) to regulate segmentation of the overall mask. Besides, a gradient loss is applied to original image and the predicted mask to preserve a rich detail. The gradient is calculated using Sobel operator with $$G_x = \begin{bmatrix} +1 & 0 & -1 \\ +2 & 0 & -2 \\ +1 & 0 & -1 \end{bmatrix} * I, G_y = \begin{bmatrix} +1 & +2 & +1 \\ 0 & 0 & 0 \\ -1 & -2 & -1 \end{bmatrix} * I \quad (1)$$

Then the difference between the images of the mask is penalized.

The first figure presents the gradient loss which contributes to rich details especially at the hair region. The gradient loss utilises the image 308 to mask all the ridges 310 and put a mask overlay 312 on the image. The gradient loss will penalize any ridges in the image level, while the BCE loss will constrain the semantic mask of human beings. The combination of them enables the network to identify the so-called semantic ridges such as the hair.

Figure 3C:
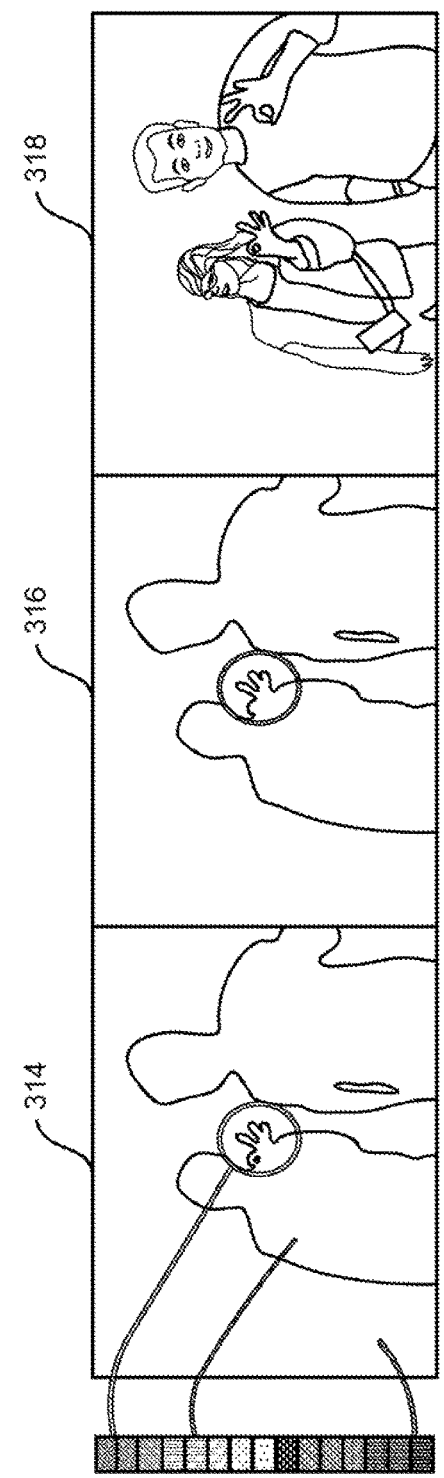
FIG. 3C illustrates the hierarchical hybrid loss module in a hierarchical hybrid loss in accordance with the present invention.

FIG. 3C illustrates the hierarchical hybrid loss module in accordance with the present invention 300c. The Hierarchical Hybrid Loss is used in this proposal has several parts, the first one is the traditional BCE loss (Binarycross entropy) to regulate segmentation of the overall mask. Besides, a gradient loss is applied to original image and the predicted mask to preserve a rich detail. The gradient is calculated using Sobel operator with $$G_x = \begin{bmatrix} +1 & 0 & -1 \\ +2 & 0 & -2 \\ +1 & 0 & -1 \end{bmatrix} * I, G_y = \begin{bmatrix} +1 & +2 & +1 \\ 0 & 0 & 0 \\ -1 & -2 & -1 \end{bmatrix} * I \quad (1)$$

Then the difference between the image with $2^{nd}$ layer 318 is penalized. Some specific body components such as human hands are usually very hard to handle as observed in 314 due to its extremely nonlinear local patterns. To solve this problem, and additional hand loss is presented as observed in 316. It is a local BCE loss that only considers the region within the hand bounding box. In order to use this loss, we also label the hand areas in segmentation ground truth. In this manner, above traditional losses, local losses are presented to refine the result which makes the outcome of the masks in a hierarchical fashion. Together with tuned weight parameters, all the losses are combined together which gives the following formulation.

L_total=L_BCE(image)*W_image+L_BCE(hand)
*W_hand+GRD(image)*W_image

The outcome 318 of masks with applied proposed losses are shown as 314 and 316 in FIG. 3C. FIG. 3B represents the gradient loss which contributes to rich details especially at the hair region. The gradient loss will penalize any ridges in the image level, while the BCE loss will constrain the semantic mask of human beings. The combination of them enables the network to identify the so-called semantic ridges such as the hair.

Moreover, the figure shows the comparison results of hierarchical hybrid loss and traditional BCE loss. Firstly, for direct visual performance, the one with hybrid loss has better and more intact mask segmentation of the hand areas. Besides, due to the involvement of hierarchical loss, the outcome mask becomes a continues distribution with background in the range of0-0.3, foreground human in the range of 0.6-0.8 and hand region at above 0.8, because it is heavily penalized with additional hand losses.

Further, the segmentation is no longer binary classification problem but becomes a regression one which benefits the convergence of the network. And the network is able to identify which part it should focus on and put more effort to learn to achieve better results.

Figure 4A:
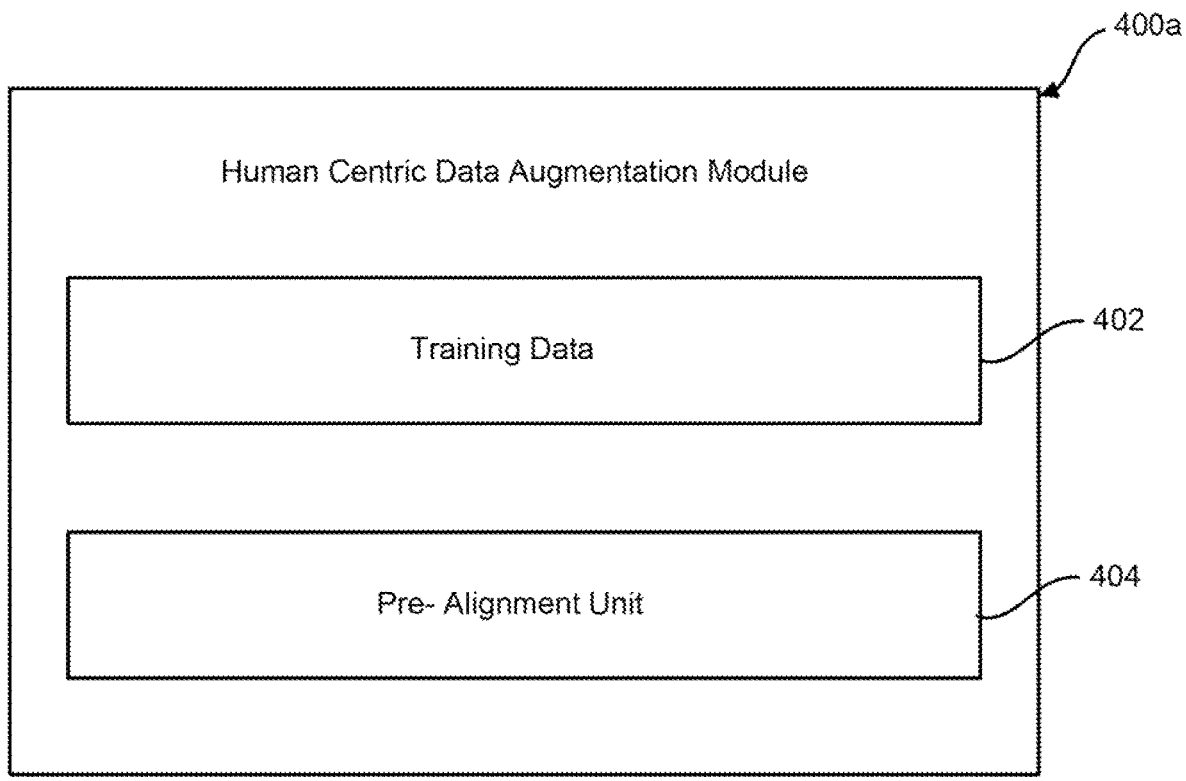
FIG. 4A illustrates a human centric data augmentation module of the image processing system.

FIG. 4A illustrates a human centric data augmentation module 400a in the image processing system. The human centric data augmentation module performs a pre-alignment of the masked portrait region to center area and generates an output image.

The pre-alignment of the training data 402 is performed by a pre-alignment unit 404. The workflow is depicted in the following figure. In the image and mask, the centre as well as the size of the human body is found in the mask. A corresponding affine transformation matrix is calculated such that after it is applied, the original human portrait will be shifted to the centre area of the image with relatively consistent scales.

FIG. 4B illustrates the human centric data augmentation module in accordance with the present invention 400b. In preparation of training data, the data's distribution should be consistent with the practical use case such that the network can perform well on similar scenarios. Thus, we propose additional augmentation procedure on top of the traditional data augmentation schemes during training. It is observed that the major human in a frame 406 has large probability to locate at centre.

Therefore, a pre-alignment of the training data should be performed. The workflow is depicted in the following figure. Given portrait image masked centre and size 408, the centre as well as the size of the human body is found in the mask 410. A corresponding affine transformation matrix is calculated such that after it is applied, the original human portrait will be shifted to the centre area of the image with relatively consistent scales 412. In this manner, most of the user case can be covered.

Moreover, there is one more advantage of this processing that the background person will be well suppressed, which contributes to a convenient operation in adopting photographical effects such as bokeh. Performing the alignment 414 after the human centric alignment 416, traditional data augmentation strategies such as rotation, translation, scaling is performed in a controllable manner.

Figure 5:
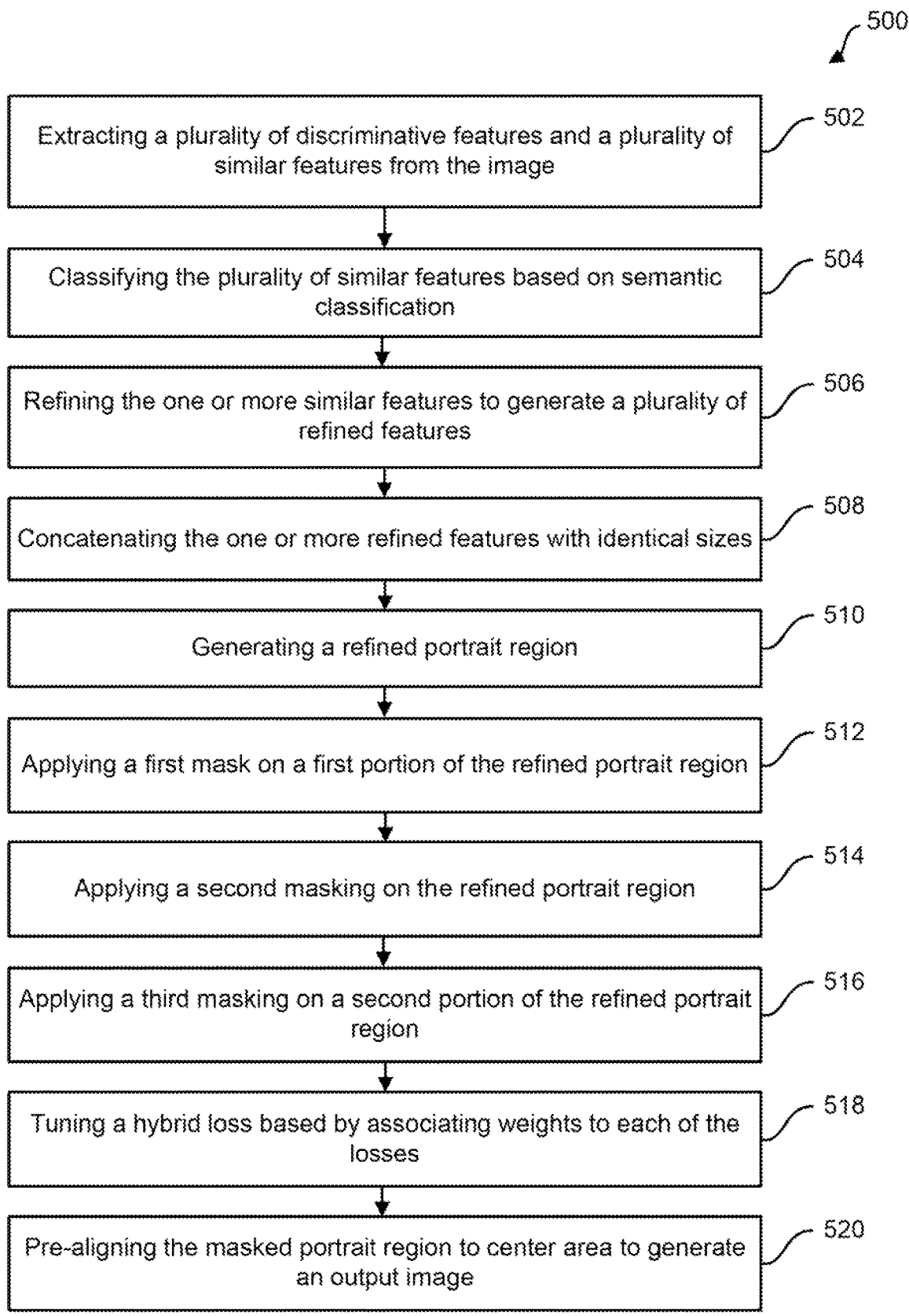
FIG. 5 illustrates a method for processing an image.

FIG. 5 illustrates a method for processing an image 500. The method includes extracting a number of discriminative features and a number of similar features by an encoder 502. The number of discriminative features and a number of similar features are from the image at one or more predefined levels. Classifying the number of similar features based on the semantic classification 504.

Followed with, refining the one or more similar features to generate a number of refined features by a decoder 506. Then concatenating the one or more refined features with identical sizes 508 to generate a refined portrait region 510 through a skip fusion connection logic.

Then, applying a first mask on a first portion of the refined portrait region based on a binary cross entropy (BCE) loss 512. Next, applying a second masking on the refined portrait region based on a gradient loss 514 and then applying a third masking 516 on a second portion of the refined portrait region based on a local balanced cross entropy (BCE) loss.

Tuning a hierarchical hybrid loss 518 based on associating weights to each of the binary cross entropy (BCE) loss, the gradient loss and the local binarycross entropy (BCE) loss to generate a masked portrait region. Finally, pre-aligning is performed for the masked portrait region to the center area to generate an output image through a human centric data augmentation module 520.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. An image processing system for processing an image, wherein the image processing system comprising:
   a classification module, wherein the classification module classifies a portrait region of the image, further wherein the classification module comprising:
      an encoder-decoder unit, wherein the encoder-decoder unit comprising:
         an encoder, wherein the encoder extracts and classifies a plurality of discriminative features and a plurality of similar features from the portrait region, further wherein the plurality of similar features are classified based on semantic classification at one or more predefined levels; and
         a decoder, wherein the decoder refines the one or more similar features to generate a plurality of refined features;
      a skip fusion connection logic, wherein the skip fusion connection logic concatenates the plurality of refined features to generate a refined portrait region of the image;
   a hierarchical hybrid loss module, wherein the hierarchical hybrid loss module comprising:
      a binarycross entropy (BCE) loss unit, wherein the binarycross entropy loss unit regulates a first masking applied on a first portion of the refined portrait region;
      a gradient loss unit, wherein the gradient loss unit applies a second masking the refined portrait region; and
      a local binarycross entropy (BCE) loss unit, wherein the local binarycross entropy loss unit regulates a third masking applied on a second portion of the refined portrait region to form a masked portrait region;
   a human centric data augmentation module, wherein the human centric data augmentation module performs a pre-alignment of the masked portrait region to center area and generates an output image.

2. The image processing system in accordance with claim 1, wherein the encoder and the decoder form a plurality of layers.

3. The image processing system in accordance with claim 1, wherein the skip fusion connection logic reuses the plurality of refined features at each of the one or more predefined levels to generate the refined portrait region.

4. The image processing system in accordance with claim 3, wherein the concatenation is performed by the skip fusion connection logic based on fusion neurons.

5. The image processing system in accordance with claim 4, wherein the fusion neurons are trained to learn a fusion ratio between the plurality of refined features.

6. The image processing system in accordance with claim 1, wherein the skip fusion connection logic concatenates the plurality of refined features on the basis of similarity in size and a number of channels.

7. The image processing system in accordance with claim 1, wherein the first portion if of a human portrait.

8. The image processing system in accordance with claim 1, wherein the second portion either of a hand or a foot of the human portrait.

9. The image processing system in accordance with claim 1, wherein the gradient loss unit applies the second masking by analyzing one or more ridges of the portrait region.

10. The image processing system in accordance with claim 9, wherein the one or more ridges based on hairs or beard.

11. The image processing system in accordance with claim 1, wherein the Hierarchical Hybrid Loss unit calculates a hybrid loss based on the BCE loss unit, the gradient loss unit and local BCE loss unit.

12. The image processing system in accordance with claim 11, wherein the hybrid loss is calculated by applying weights to each of a BCE loss, a gradient loss and a local BCE loss.

13. A method for processing an image, wherein the method comprising:
   extracting a plurality of discriminative features and a plurality of similar features from the image at one or more predefined levels,
   classifying the plurality of similar features based on semantic classification;
   refining the one or more similar features to generate a plurality of refined features;
   concatenating the one or more refined features with identical sizes to generate a refined portrait region:
   applying a first mask on a first portion of the refined portrait region based on a binarycross entropy (BCE) loss;

applying a second masking on the refined portrait region based on a gradient loss;

applying a third masking on a second portion of the refined portrait region based on a local binarycross entropy (BCE) loss;

tuning a hybrid loss based by associating weights to each of the binarycross entropy (BCE) loss, the gradient loss and the local binarycross entropy (BCE) loss to generate a masked portrait region; and pre-aligning the masked portrait region to center area to generate an output image.

14. A non-transitory computer program product comprising a computer useable medium having computer program logic for enabling at least one processor in a computer system for processing an image via a software platform, said computer program logic comprising:

extracting a plurality of discriminative features and a plurality of similar features from the image at one or more predefined levels, classifying the plurality of similar features based on semantic classification;

refining the one or more similar features to generate a plurality of refined features;

concatenating the one or more refined features with identical sizes to generate a refined portrait region;

applying a first mask on a first portion of the refined portrait region based on a binarycross entropy (BCE) loss;

applying a second masking on the refined portrait region based on a gradient loss;

applying a third masking on a second portion of the refined portrait region based on a local binarycross entropy (BCE) loss;

tuning a hybrid loss based by associating weights to each of the binarycross entropy (BCE) loss, the gradient loss and the local binarycross entropy (BCE) loss to generate a masked portrait region; and pre-aligning the masked portrait region to center area to generate an output image.

* * * * *